United States Patent [19]

Gabbert

[11] Patent Number: 4,863,081
[45] Date of Patent: Sep. 5, 1989

[54] GARMENT HANGING RACK

[76] Inventor: Harvey L. Gabbert, 290 Circle Hills, Grand Forks, N. Dak. 58201

[21] Appl. No.: 217,342

[22] Filed: Jul. 11, 1988

[51] Int. Cl.[4] .................................................. B60R 7/00
[52] U.S. Cl. ........................ 224/42.45 A; 224/42.46 A; 224/313; 211/118
[58] Field of Search .............. 224/42.45 R, 42.45 A, 224/42.46 R, 42.46 A, 311, 312, 313, 327, 42.43, 42.49; 211/113, 118, 123, 105.1, 96; 248/339, 301; 108/44, 135, 160; 297/190

[56] References Cited

U.S. PATENT DOCUMENTS

| D. 181,237 | 10/1957 | Spielman | 211/101 |
|---|---|---|---|
| 2,453,919 | 11/1948 | Johnson et al. | 211/96 |
| 2,528,794 | 11/1950 | Seidler | 224/42.45 A |
| 2,720,436 | 10/1955 | Covey | 108/135 |
| 2,987,193 | 6/1961 | Pajor | 211/96 |
| 3,002,666 | 10/1961 | Silverman | 224/42.45 |
| 3,217,670 | 11/1965 | Struensee | 108/135 |
| 3,275,161 | 9/1966 | Robertson | 211/87 |
| 3,294,248 | 12/1966 | Olson | 211/96 |
| 3,319,853 | 5/1967 | Wigington | 224/42.1 |
| 3,329,385 | 7/1967 | Dietsch | 248/290 |
| 3,355,031 | 11/1967 | Kleehammer | 211/123 |
| 3,481,483 | 12/1969 | Harvey | 211/105.3 |
| 3,596,815 | 8/1971 | Willett | 224/42.1 |
| 3,708,093 | 1/1973 | Toms, II | 224/42.45 |
| 3,724,677 | 4/1973 | Vogelhuber et al. | 211/96 |
| 3,779,501 | 12/1973 | Zibell | 248/302 |
| 4,412,636 | 11/1983 | Greene | 224/313 |
| 4,444,344 | 4/1984 | Marcus | 224/313 |
| 4,640,543 | 2/1987 | Bradley | 296/97 |

Primary Examiner—Henry J. Recla
Assistant Examiner—Edward C. Donovan
Attorney, Agent, or Firm—Robert C. Baker

[57] ABSTRACT

The invention comprises a removeable and adjustable rack for mounting on a fixed garment hook inside the body compartment of a motor vehicle to increase garment hanging capacity. It includes a base plate which has an opening for hanging on a fixed garment hook and has opposing lateral side edges. The base plate has wing plates pivotably connected to the opposing lateral side edges. The wing plates can be pivotably adjusted to abut against the inside surface of the body compartment to stabilize the mounting of the base plate on the fixed garment hook. A hanger arm projects from the base plate to support plural garment hangers.

26 Claims, 1 Drawing Sheet

U.S. Patent  Sep. 5, 1989  4,863,081
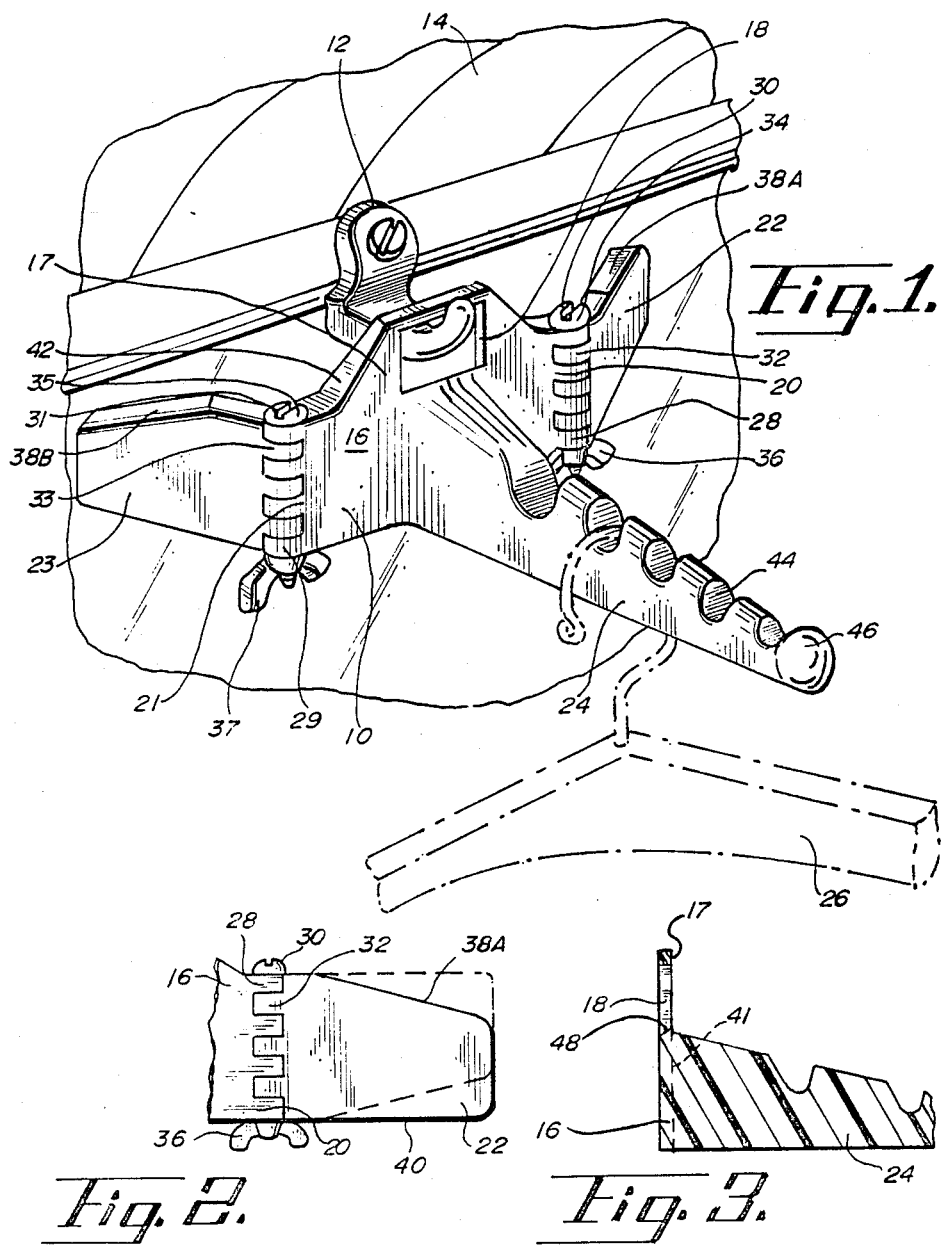

GARMENT HANGING RACK

BACKGROUND OF THE INVENTION

This invention relates to an automobile garment rack designed to be hung from a fixed garment hook inside the body compartment of a motor vehicle so as to increase the garment hanging capacity.

The contour of a motor vehicle body compartment in areas adjacent the usual fixed garment hook varies greatly from vehicle to vehicle. A garment rack nevertheless should be designed to match the contours of the environment of its use, and should be constructed to provide lateral stability such that the rack will not sway and bounce wildly as the motor vehicle encounters bumps and turns in roads. Others previously have attempted to solve these problems with devices which have limited use for only a few different interior contours.

Insofar as known, no one has heretofore proposed a removable versatile garment hanging rack which does not require a window or window frame or other specific contours of structure for stabilized mounting and which has adjustment features such as pivotable wing plates that permit stable mounting of it in motor vehicles having an exceedingly wide variety of body compartment contours.

SUMMARY OF THE INVENTION

This invention provides a removable and adjustable garment rack which is mounted over a fixed garment hook inside the body compartment of a motor vehicle. The garment rack has a base plate with an opening through which the fixed garment hook of the vehicle is received when the rack is hung on that hook. Two pivotable wing plates are pivotably connected to the base plate and lockable against pivot movement. A hanger arm projects from the base plate to support garment hangers.

The base plate has opposing lateral side edges with each side edge preferably having a series of aligned and spaced base sleeve members. The wing plates also preferably have spaced and aligned sleeve members which intermesh with the base sleeve members. In this preferred arrangement, a pin member with a head on one end is inserted through the base and wing sleeve members at each side edge of the base plate so as to form the pivotable connection. The wing plates are pivoted into positions where they abut against the inside surface of the body compartment adjacent the fixed hook. Fixing means is applied on the pin members at a location opposite the head end and cooperates with the heads of the pins to push or pull the base and wing sleeve members together and thereby deflect the sleeve members sufficiently to lock the wing members in desired adjusted position. The sleeve members are brought together with sufficient force to prevent further pivot movement of the wing plates.

Preferably, the wing plates are constructed so as to have upper and lower wing edges in opposing relationship but of different contour. Most preferably, the pivoted connection of the wing plates to the base plate is such that either wing plate may be turned upside down or reversed in use and thus present either of its opposing wing edges as the upper edge for fitting in closely abutting or pressing relationship against an interior body compartment contour.

Other features and benefits of this invention will be evident as this description proceeds.

BRIEF DESCRIPTION OF THE DRAWING

FIG. 1 is a schematic perspective view of the garment hanging rack mounted on a fixed garment hook inside the body compartment of a motor vehicle;

FIG. 2 is a schematic frontal plan view, partially broken away, of a wing plate connected to the base plate and contains dotted lines to illustrate the wing plate connected to the base plate in an upside down position; and FIG. 3 is a schematic representation of a cross-sectional view, with parts broken away, taken along a vertical plane bisecting the left and right halves of the garment hanging rack of FIG. 1 and illustrates the downward slope of the bottom edge of the opening or aperture in the base plate.

DESCRIPTION OF PREFERRED EMBODIMENT

Referring to FIG. 1 of the drawing, the removeable and adjustable garment rack 10 is mountable on a fixed garment hook 12 inside the body compartment 14 of a motor vehicle. The garment rack 10 is mounted to the fixed garment hook 12 through an opening 18 through a base plate 16. The base plate 16 has two pivotable wing plates 22 and 23 which are connected to opposing lateral side edges 20 and 21 of the base plate to position and support the base plate against the inside contour of the body compartment 14 of a motor vehicle. A hanger arm 24 extends from the base plate to support garment hangers 26. Although the structure may be formed out of metal, it is most preferably formed out of plastic by any suitable molding technique.

Preferably, the base plate 16 has opposing lateral side edges 20 and 21 with each side edge preferably having a series of aligned and spaced base sleeve members 28 and 29. The holes of the sleeve members are all in alignment such that pin members 30 and 31 may be placed through the aligned holes of the sleeve members.

The wing plates 22 and 23 also are preferably constructed having spaced and aligned sleeve members 32 and 33 which intermesh with the base sleeve members 28 and 29. The holes of the sleeve members are also in alignment such that the pin members 30 and 31 may be placed through the aligned sleeve members of both the base plate and wing plate for pivotable movement of the wing plates 22 and 23 about the pin members 30 and 31.

Preferably, threaded pin members 30 and 31 with heads 34 and 35 on one end (for example threaded bolts) are inserted through the base and wing sleeve members to form the pivotable connection. The heads 34 and 35 may be smooth or have an appropriate slot which receives a tightening tool such as a screwdriver. The wing plates 22 and 23 are pivoted about the pins 30 and 31 in a forward or in a backward position such that they abut against at least a portion of the inside wall of a body compartment at a location lateral to the fixed garment hook of the vehicle. The fixing means 36 and 37 may comprise a variety of fastening means such as threaded nuts, spring pins or clamps. Preferably, wing nuts are used as the fixing means. The fixing means or wing nuts 36 and 37 are threaded around the pin members 30 and 31 opposite the heads 34 and 35 of the pin members. The wing nuts 36 and 37 are tightened to push the base and wing sleeve members together. The sleeve members are elastically deflected together with sufficient force to prevent movement of the wing plates 22 and 23. The elastic deformation of the sleeve members need not be great but is sufficient to enable the wing plates 22 and 23 to be locked by friction into position and unlocked for pivot readjustment of the wing plates for repeated use of the garment rack.

The wing plates 22 and 23 may be locked in abutting condition against window glass, trim or any other inside surface of the body compartment lateral to the base plate of the hanger. At least a portion of the upper edge of a wing plate will usually be pressed against upper body compartment surfaces, which further contributes to stabilization of the rack in use. The preferred plastic composition of the structure as well as the relatively smooth edges of its parts contributes to versatile use and avoidance of scratching or tearing of body compartment materials.

The locked wing plates 22 and 23 provide lateral support to the base member 16. The lateral support is tailored to the body interior and prevents swaying and tilting of the hanger arm as the motor vehicle encounters sudden turns or bumps in the road.

The wing plates 22 and 23 are constructed with two opposing wing edges comprising a first wing edge 38 (illustratively numbered 38A and 38B in the drawing) and a second opposing wing edge 40 (See FIG. 2). The first opposing wing edge 38A of the illustrative wing plate of FIG. 2 is constructed with a different slope than the second opposing wing edge 40. Wing edge 38A has a downward slope toward said second opposing wing edge 40. The second opposing wing edge 40 of the wing plate 22 extends more or less perpendicularly outward from the base plate. Ideally, the left and right wing plates are constructed so as to be identical in contour and detail so that the left and right side wing plates may be interchanged. This reduces tooling and production costs. However, the contour of the upper and lower edges of the lateral wing plates may be different if desired.

Most preferably, the sleeve members 28, 29, 32 and 33 on the base plate and wing plates are symmetrical in arrangement so as to permit hinged connection (as demonstrated in FIG. 2) with either wing edge 38A or 40 as the upper edge. Thus, the hinged connection to the base plate 16 is such that either the first opposing wing edge 38A or the second opposing wing edge 40 may be the upper or the lower wing edge when the wing plate is connected to the base plate. The reversible connection of the wing plate to the base plate allows greater flexibility in matching the contours of various automobiles. The asymmetry of the opposing wing edges 38 and 40 combined with the interchangeable connection of wing plates 22 and 23 provides a unique relationship for stabilized mounting of the hanger in different and varied interior vehicle contours.

The wing plates to be connected to the base plate in four different configurations. The wing plates may be connected with both first edges 38A and 38B up, both first edges 38A and 38B down, only the right first edge 38A up or only the left first edge 38B up. The wing plates 22 and 23 may also be constructed with alternative shapes to further enhance the matching to the inside contour of the body compartment of motor vehicles. The matching between the wing plates and the inside contour of the motor vehicle improves the stability of the abutment of the wing plates against the inside body surfaces which in-turn increases the stabilization that the wing plates provide to the base plate.

The opening 18 of the base plate 16, (see FIG. 1) is suitably generally rectangularly shaped. However, it may taper upwardly to provide centering over a fixed garment hook. The opening 18 through the base plate is located in a position that is spaced above the hanger arm 24 and spaced downwardly from the uppermost portion of the base plate. The bottom edge of the opening is ideally constructed with a downwardly sloped surface 48 (see FIG. 3) extending from the front face 17 to the rear surface of the base plate. The slope is preferably between 30 and 60 degrees, preferrably about 45 degrees and enhances the ease of placement of the base plate on a fixed garment hook. To be noted is that dash line 41 in the schematic showing of FIG. 3 is to illustrate the dividing line between the base plate 16 and the hanger arm 24. These parts however are integrally united. The horizontal width of the opening 18 is suitably about 3 centimeters or about 1-⅛ inches in length. The vertical height of the opening at its narrowest near the front face 17 is suitably about 2 centimeters or about ⅜ of an inch. These dimensions may vary but generally will be found to maximize the usefulness of the opening 18, such that the garment rack may be mounted on nearly all existing fixed garment hooks inside the body compartments of automobiles, trucks and other motor vehicles.

The uppermost base plate edges (See FIG. 1) adjacent the opening 18 are suitably constructed with downwardly sloped shoulders 42. The thickness of the shoulders 42 increases in the downward direction. The back or rear surface of the base plate will normally be generally flat.

The hanger arm 24 preferably is integral with the base plate such that the hanger arm 24 is united to the base plate 16 with a continuous and homogeneous connection. The hanger arm 24 may be hollow for economy or may be formed to have an inverted U-shape in vertical sections transverse to its length. The hanger arm 24 suitably tapers from a relatively thick transverse cross-section at base plate 16 to a relatively thin cross-section at its outward end. The garment hangers 26 are supported in grooves 44 formed in the upper surface of the hanger arm. The grooves 44 extend laterally across the hanger arm 24 and are suitably hemi-cylindrically depressions. The grooves 44 may hold two or more hangers, but preferably one hanger per groove is used so as to space the hanging clothing. An upward knob 46 at the end of the hanger arm may be employed as a barrier against hangers sliding off the arm.

Preferably, the base plate has a sleeve member at both the top and bottom of its opposing side edges 20 and 21. The sleeve members of the wing plates will be noted to be preferably not at the uppermost and lowermost inner edge of the wing plates. Thus the wing plates are easily inverted or turned upside down or reversed in position without disrupting an attractive design appearance for the connection of the wing plates to the base plate. Of course, if desired, the uppermost and lowermost sleeve members may be placed on the wing plates, with the upper and lower sleeve members of the base plate meshing between them.

The invention may be embodied in other specific forms than illustrated without departing from the spirit or essential characteristics thereof. The illustrated embodiment is therefore to be considered in all respects as illustrative and not restrictive, the scope of the invention being indicated by the appended claims rather than by the foregoing description; and all changes which That which is claimed is:

1. A removable and adjustable garment rack for mounting on a fixed garment hook inside the body compartment of a motor vehicle to increase garment hanging capacity, comprising:
   a base plate having an opening therethrough for hanging said base plate on the fixed garment hook, said base plate having opposing lateral side edges,
   wing plates pivotably connected to said opposing lateral side edges for pivotable adjustment of said wing plates into abutting condition against surfaces inside the body compartment on opposite sides of said base plate, one said wing plate being at each lateral side edge of said base plate, and
   a hanger arm projecting from said base plate for supporting plural garment hangers.

2. The garment rack of claim 1 wherein said wing plates have upper and lower wing edges in opposing relationship, the opposing wing edges of at least one of said wing plates being of different contour.

3. The garment rack of claim 1 wherein at least one of said wing plates includes upper and lower wing edges opposing each other and of different contour, and wherein the pivotal connection of at least one of said wing plates to a lateral side edge of said base plate allows for either of said opposing wing edges to be the uppermost edge of the wing plate as it is connected to said base plate.

4. The garment rack of claim 1 additionally including means for locking said wing plates against pivotal movement.

5. The garment rack of claim 1 wherein the connection of said wing plates to said base plate comprises a threaded pin member having a head at one end and a wing nut at the other for locking said wing plates against pivotal movement.

6. The garment rack of claim 1 wherein said opening in said base plate has a bottom edge downwardly sloped from the face to the rear surface of said base plate to enhance mounting of said base plate on the fixed garment hook.

7. The garment rack of claim 1 wherein said hanger arm is non-pivotable at its projection from said base plate.

8. A removable and adjustable garment rack for mounting on a fixed garment hook inside the body compartment of a motor vehicle to increase garment hanging capacity, comprising:
   a base plate having an opening therethrough for hanging said base plate on the fixed garment hook and having opposing lateral side edges, said opposing lateral side edges having a series of aligned and spaced base sleeve members,
   wing plates pivotably connected to said base sleeve members for pivotable adjustment of said wing plates into abutting condition against surfaces inside the body compartment on opposite sides of said base plate, said wing plates having aligned and spaced wing sleeve members which intermesh and align with said base sleeve members,
   a pin member extending through said base and wing sleeve members at each lateral side edge of said base plate, for hinged pivotable movement of said wing plates about said pin member, said pin member having a head at one end to prevent said pin member from being pulled through said sleeve members,
   fixing means opposite said pin head for tightening on said pin so as to pull said base and wing sleeve members together with sufficient force to lock the wing plates against pivot movement in a desired position on said base plate, and
   a hanger arm projecting from said base plate, said hanger arm having a series of grooves for supporting garment hangers.

9. The garment rack of claim 8 wherein said wing plates have upper and lower wing edges in opposing relationship, the opposing wing edges of at least one of said wing plates being of different contour.

10. The garment rack of claim 8 wherein at least one of said wing plates includes upper and lower wing edges opposing each other and of different contour, and wherein the pivotal connection of at least one of said wing plates to said base sleeve members of said base plate allows for either of said opposing wing edges to be the uppermost edge of the wing plate as it is connected to said base plate.

11. The garment rack of claim 8 wherein said fixing means comprises a wing nut.

12. The garment rack of claim 8 wherein said pin member is threaded and said fixing means comprises a wing nut threaded on said pin member.

13. The garment rack of claim 8 wherein said opening in said base plate has a bottom edge downwardly sloped from the face to the rear surface of said base plate to enhance mounting of said base plate on the fixed garment hook.

14. The garment rack of claim 8 wherein said hanger arm is non-pivotable at its projection from said base plate.

15. A removable and adjustable garment rack for mounting on a fixed garment hook inside the body compartment of a motor vehicle to increase garment hanging capacity, comprising:
   a base plate having an opening therethrough for hanging said base plate on the fixed garment hook, said base plate having opposing lateral side edges,
   wing plates pivotably connected to said opposing lateral side edges for pivotable adjustment of said wing plates into abutting condition against surfaces inside the body compartment on opposite sides of said base plate, said wing plates have upper and lower wing edges in opposing relationship, the opposing wing edges of at least one of said wing plates being of different contour, and
   a hanger arm projecting from said base plate for supporting plural garment hangers.

16. The garment rack of claim 15 wherein the pivotal connection of at least one of said wing plates to a lateral side edge of said base plae allows for either of said opposing wing edges to be the uppermost edge of the wing plate as it is connected to said base plate.

17. The garment rack of claim 15 additionally including means for locking said wing plates against pivotal movement.

18. The garment rack of claim 15 wherein the connection of said wing plates to said base plate comprises a threaded pin member having a head at one end and a wing nut at the other for locking said wing plates against pivotal movement.

19. The garment rack of claim 15 wherein said opening in said base plate has a bottom edge downwardly sloped from the face to the rear surface of said base plate to enhance mounting of said base plate on the fixed garment hook.

20. The garment rack of claim 15 wherein said hanger arm is non-pivotable at its projection from said base plate.

21. A removable and adjustable garment rack for mounting on a fixed garment hook inside the body compartment of a motor vehicle to increase garment hanging capacity, comprising:
- a base plate having an opening therethrough for hanging said base plate on the fixed garment hook, said base plate having opposing lateral side edges,
- wing plates pivotably connected to said opposing lateral side edges for pivotable adjustment of said wing plates into abutting condition against surfaces inside the body compartment on opposite sides of said base plate,
- means for locking said wing plates against pivotal movement, and
- a hanger arm projecting from said base plate for supporting plural garment hangers.

22. The garment rack of claim 21 wherein said wing plates have upper and lower wing edges in opposing relationship, the opposing wing edges of at least one of said wing plates being of different contour.

23. The garment rack of claim 21 wherein at least one of said wing plates includes upper and lower wing edges opposing each other and of different contour, and wherein the pivotal connection of at least one of said wing plates to a lateral side edge of said base plate allows for either of said opposing wing edges to be the uppermost edge of the wing plate as it is connected to said base plate.

24. The garment rack of claim 21 wherein the connection of said wing plates to said base plate comprises a threaded pin member having a head at one end and a wing nut at the other.

25. The garment rack of claim 21 wherein said opening in said base plate has a bottom edge downwardly sloped from the face to the rear surface of said base plate to enhance mounting of said base plate on the fixed garment hook.

26. The garment rack of claim 21 wherein said hanger arm is non-pivotable at its projection from said base plate.

* * * * *